United States Patent Office 3,438,521
Patented Apr. 15, 1969

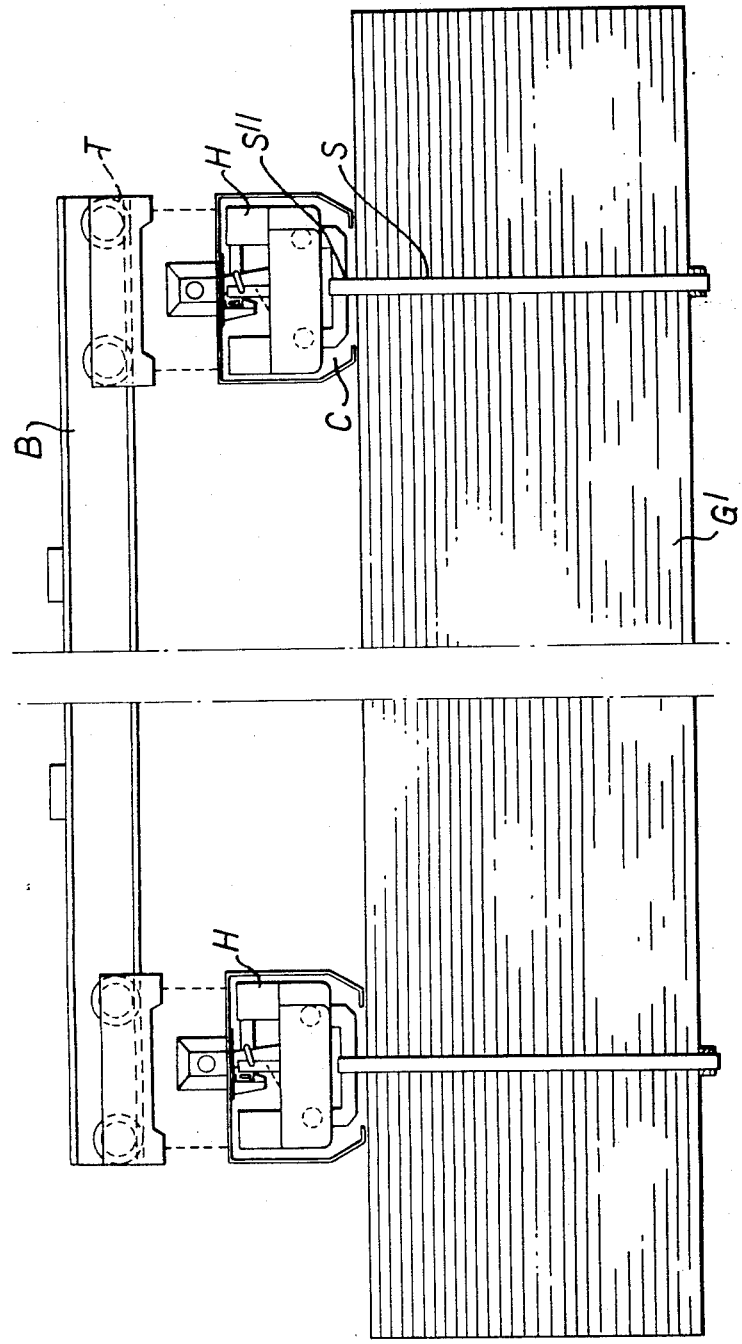

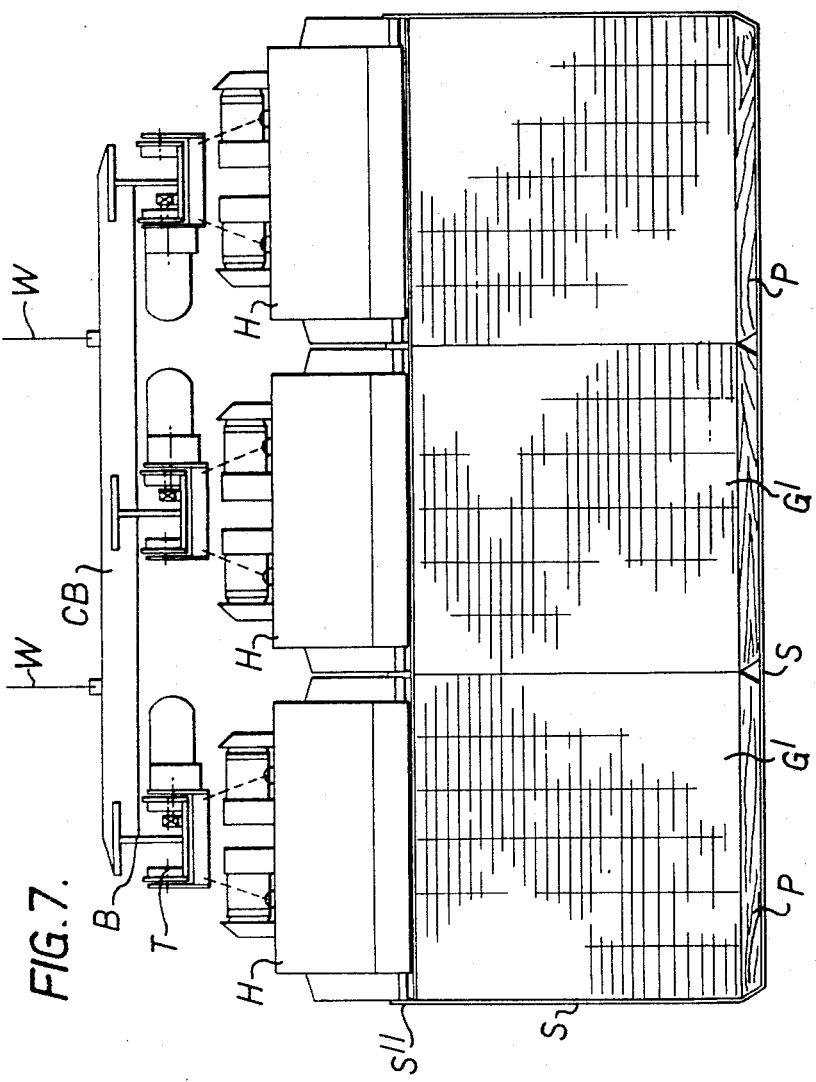

1

3,438,521
METHOD FOR THE LIFTING OF TRANSPORT GOODS
Fredrik Munck, Bergen, Norway, assignor to Sverre Munck A/S, Bergen, Norway
Filed Sept. 21, 1967, Ser. No. 669,473
Claims priority, application Norway, Sept. 26, 1966, 164,891
Int. Cl. B66c 1/34, 1/04
U.S. Cl. 214—152                                           2 Claims

ABSTRACT OF THE DISCLOSURE

A method for lifting loads which consists of a plurality of objects which are retained in an assembled condition by a strap which is formed by a length of steel band that has one end attached to a point intermediate the ends of the band. A lifting loop is formed by attaching the free end of the band to the strap at a point intermediate its ends. Lifting means first engaging the lifting loop on its upper side to separate it from the strap and then engaging the loop on its lower side to lift the strap and the articles held thereby.

---

The present invention relates to a method for lifting of such transport goods as for example wood materials, bales, etc., which are assembled to suitable dimensioned transport units of convenient weight.

Previously such assembled transport units were lifted either by means of a strap being laid around the goods for its assemblage and lifting or fork trucks or the like were used based on the fork lifting principle.

The previously known methods and devices made it necessary to restrict the dimensions and weight of the units to be lifted to a maximum of about 2 tons. For modern transport arrangements including loading and unloading it is desirable to increase the capacity substantially. This is carried out by assembling the transport goods by means of the method according to the invention to form larger and better assembled units than previously was possible. At the same time the invention provides means whereby a number of such units can be lifted by a convenient crane or the like.

To have a better understanding of the invention reference is had to the drawings, where schematically is shown the method used for the assembling of the transport goods according to the invention, as well as an example of a device for the lifting of the goods.

FIGS. 6 and 7 show, seen from the one side respective from the end, an example of a device for simultaneous lifting of a number of transport units.

Figure 1:
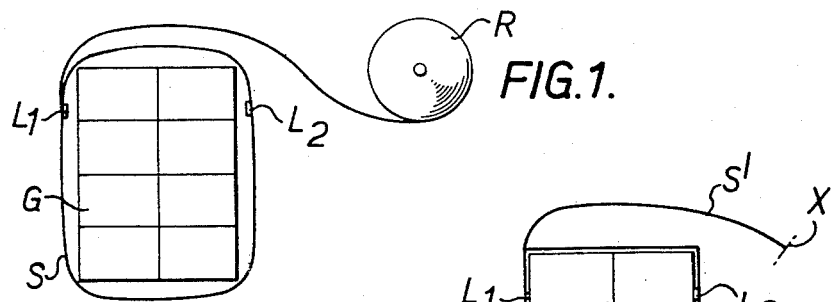
FIGS. 1–3 show schematically how the transport goods are strapped and arranged for the lifting.
Figure 2:
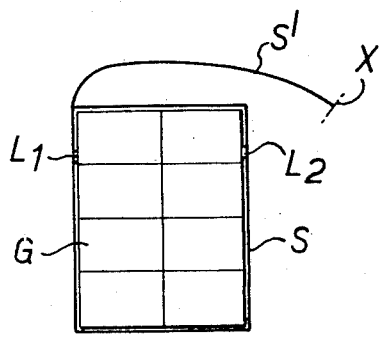
Figure 3:
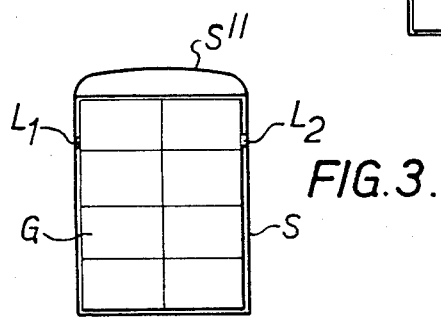

In FIGS. 1–3 is seen how the strapping of a number of units on point of principle is carried out. In the figures these are suggested as bales or boxes, which as a whole are denoted G. In the example shown there are displayed eight bales or boxes in each transport unit. Around such unit is laid one or more straps according to the length of the goods to be lifted. Each strap is obtained by forming around the unit a loop S of steel band, which is taken from a suitable supply, for example the roll R. The loop S is provided with two strapping band locks L1 and L2.

In FIG. 2 is shown how said loop S is tightened so that it lies firmly against the external surfaces of the goods and maintains the bales or boxes as an assembled transport unit. A length S' of the band is then cut off as seen in FIG. 2. The cut off end piece X is then connected with the loop S by means of the band lock L2.

2

Thereby the transport unit of FIG. 3 is obtained. The goods G is here firmly assembled by the steel band strapping S, and this is at the top provided with a lifting loop or handle S'' of the same steel band material and secured to the loop S by the band locks L1 and L2.

Figure 4:
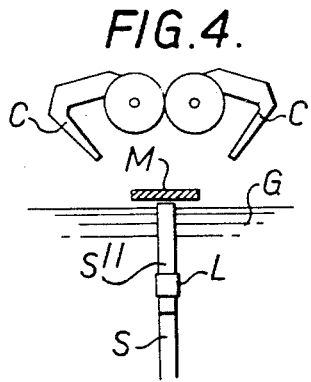
FIGS. 4 and 5 show schematically the means by which the lifting is carried out.
Figure 5:
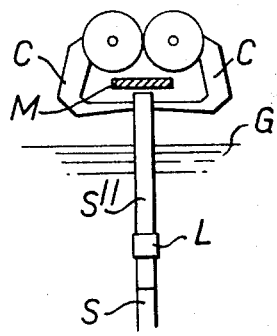

In accordance with a further feature of the invention the device, by means of which the unit G should be lifted hanging in the lifting loop S'', is provided with magnets arranged in connection with lifting hooks or claws. In the example shown in FIGS. 4 and 5 the magnet member is indicated at M and the lifting claws are constituted by cooperating rotatably journalled arms C, C. In FIG. 4 is shown how the lifting device is lowered down over the transport unit G so that the magnet M rests against the top surface of the lifting loop S''. The magnet M is then lifted up to the position shown in FIG. 5, and the claws C, C are swung against each other so that they grip under the steel band loop S'', whereupon the unit G can be lifted hanging under said loop.

In FIGS. 6 and 7 is shown a larger device by means of which transport units G', according to the above described principle, can be lifted. In the example of FIGS. 6 and 7 the transport unit is built up from a number of boards or planks held together by the steel band strapping S to form suitable units. If the boards or planks are long, and especially if it is a question of timber in full lengths, the lifting heads H comprising the gripping claws C and the magnets M cooperate with several loops S, S'', arranged along the length of the transport unit G'. The lifting heads are then preferably suspended from travelling crabs running on rail beams B, which form a part of a suitable framework CB provided with means for suspension from a wire W from a crane or other displacement device. By such arrangement is made posible lifting up to eight tons or more, which highly hastens loading and unloading, makes such work more simple and reduces time and workers.

Damage of the goods further according to experience is substantially reduced due to the assembling of the goods so that damage is prevented. Thus cross planks P or the like are placed in known way to prevent pressing in of the lower corners of the unit G'. At the top such construction does not make itself so much felt, as the lifting is carried out by the straps S''. Said straps further, in accordance with a preferred embodiment, are not gripped at the middle by a pair of claws C, C, but by such a pair of claws arranged near each end of the lifting loop S'', as will be seen from FIG. 7.

It will be understood that according to the invention there are provided a method and devices, whereby substantial advantages are obtained for loading and unloading, and the goods to be transported are assembled to units. Especially for timber and wood materials the invention is of major significance. Also for other transport goods units, as boxes, bales, rods, tubes or the like the proposed strapping and assembling to units can be useful as also the described lifting device.

I claim:
1. A method for the lifting of transport goods as for example wood materials, bales, boxes etc. assembled to suitable units, characterized by that a steel band loop is laid around the unit, which loop at each side near the top is provided with band locks; the loop being tightened around the unit so that its various parts are firmly held together whereupon the lock at the feed side of the band is closed; a suitable length of further band material is cut off from the connection with the supply roll or the like and its free end is secured to the other band lock so that above the loop tightened firmly around the unit is formed a free lifting loop or handle suited to be gripped by a convenient lifting member.

2. A method according to claim 1, characterized by that said lifting loop by means of a magnet member arranged in connection with the lifting member is lifted up from the unit so that the lifting member can grip under the loop.

References Cited

UNITED STATES PATENTS 1,663,708  3/1928  Keeler _____ 224—55

FOREIGN PATENTS 958,539  5/1964  Great Britain.

GERALD M. FORLENZA, *Primary Examiner.*

GEORGE F. ABRAHAM, *Assistant Examiner.*

U.S. Cl. X.R.

229—52; 294—74, 65.5; 100—2; 53—134, 14; 206—65